US012748620B2

(12) United States Patent
Eckert

(10) Patent No.: US 12,748,620 B2
(45) Date of Patent: Sep. 29, 2026

(54) DYNAMIC MEMORY POWER CAPPING WITH CRITICALITY AWARENESS

(71) Applicant: Advanced Micro Devices, Inc., Sunnyvale, CA (US)

(72) Inventor: Yasuko Eckert, Redmond, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1127 days.

(21) Appl. No.: 15/269,341

(22) Filed: Sep. 19, 2016

(65) Prior Publication Data

US 2019/0065243 A1 Feb. 28, 2019

(51) Int. Cl.

| | |
|---|---|
| ***G06F 9/46*** | (2006.01) |
| ***G06F 1/3206*** | (2019.01) |
| ***G06F 1/3225*** | (2019.01) |
| ***G06F 1/3234*** | (2019.01) |
| ***G06F 3/06*** | (2006.01) |
| ***G06F 9/30*** | (2018.01) |

(Continued)

(52) U.S. Cl.

CPC .......... *G06F 9/4881* (2013.01); *G06F 1/3206* (2013.01); *G06F 1/3225* (2013.01); *G06F 1/3275* (2013.01); *G06F 3/0611* (2013.01); *G06F 3/0625* (2013.01); *G06F 3/0659* (2013.01); *G06F 3/0671* (2013.01); *G06F 9/3009* (2013.01); *G06F 9/52* (2013.01); *G06F 12/02* (2013.01); *G06F 13/1626* (2013.01); *G06F 13/1642* (2013.01); *G06F 2212/1028* (2013.01); *Y02D 10/00* (2018.01)

(58) Field of Classification Search

CPC .... G06F 9/4881; G06F 1/3026; G06F 3/0611; G06F 3/0625; G06F 3/0671; G06F 9/3009; G06F 9/52; G06F 1/3206; G06F 9/3059; G06F 2212/1028; G06F 3/0659; Y02D 10/00

USPC .......................................................... 718/103

See application file for complete search history.

(56) References Cited

U.S. PATENT DOCUMENTS 5,155,858 A * 10/1992 DeBruler ................ G06F 9/505 712/30

5,487,170 A * 1/1996 Bass ..................... G06F 13/364 370/461

(Continued)

OTHER PUBLICATIONS

Singh, Sukhpal ; Chana, Inderveer, Article A Survey on Resource Scheduling in Cloud Computing: Issues and Challenges,Feb. 2016, , vol. 14, p. 217-264.*

(Continued)

*Primary Examiner* — Zujia Xu

(74) *Attorney, Agent, or Firm* — Kowert, Hood, Munyon, Rankin & Goetzel, P.C.; Rory D. Rankin

(57) ABSTRACT

Systems, apparatuses, and methods for reducing memory power consumption without substantial performance impact by selectively delaying non-critical memory requests are disclosed. A system management unit transfers an amount of power allocated from a memory subsystem to other component(s) responsive to detecting a first condition. In one embodiment, the first condition is detecting one or more processors having tasks to execute. In response to the system management unit transferring the amount of power from the memory subsystem to one or more processors, a memory controller delays non-critical memory requests while performing critical memory requests to memory.

20 Claims, 8 Drawing Sheets

(51) Int. Cl.

| | |
|---|---|
| ***G06F 9/48*** | (2006.01) |
| ***G06F 9/52*** | (2006.01) |
| ***G06F 12/02*** | (2006.01) |
| ***G06F 13/16*** | (2006.01) |

(56) References Cited

U.S. PATENT DOCUMENTS 6,418,459 B1 7/2002 Gulick
6,571,325 B1 * 5/2003 Satagopan .......... G06F 13/1615 365/230.03
6,760,852 B1 7/2004 Gulick
6,826,704 B1 11/2004 Pickett
8,533,403 B1 * 9/2013 Law .................... G06F 13/1605 711/151
9,418,712 B1 * 8/2016 Erez ...................... G06F 1/3221
9,515,491 B2 * 12/2016 Bhageria ................... H02J 3/38
9,746,893 B1 * 8/2017 Sizikov ..................... G06F 1/30
2003/0159004 A1 * 8/2003 Tsern .................... G06F 1/3203 711/144
2003/0225904 A1 * 12/2003 Kanno ................ H04L 67/1001 709/223
2005/0210304 A1 * 9/2005 Hartung ................ G06F 3/0689 713/320
2006/0288241 A1 * 12/2006 Felter .................... G06F 1/3203 713/300
2008/0168241 A1 * 7/2008 Raghavan ........... G06F 13/4239 711/158
2008/0172499 A1 * 7/2008 Moriki .................... G06F 13/36 710/22
2009/0055580 A1 * 2/2009 Moscibroda ........ G06F 13/1642 711/E12.001
2010/0128681 A1 * 5/2010 Breuer .................. H04W 28/16 370/329
2011/0022857 A1 * 1/2011 Nussbaum ............ G06F 1/3296 713/300
2011/0055603 A1 * 3/2011 Wolfe ................... G06F 1/3296 713/320
2011/0060927 A1 * 3/2011 Fillingim ............ G06F 11/3034 713/320
2012/0036334 A1 * 2/2012 Horman .............. G06F 13/1663 711/E12.001
2012/0139929 A1 * 6/2012 Kaza ....................... G06T 13/00 345/522
2012/0209442 A1 * 8/2012 Ree ..................... H04L 12/2803 700/295
2012/0210055 A1 * 8/2012 Mace .................... G06F 1/3225 711/E12.001
2012/0230209 A1 * 9/2012 Diab ....................... H04L 43/50 370/252
2012/0278530 A1 * 11/2012 Ebsen ................. G06F 13/1684 711/E12.008
2012/0290864 A1 * 11/2012 Seroff ....................... G06F 1/26 713/340
2013/0124810 A1 * 5/2013 Carter ..................... G06F 12/08 711/171
2013/0254562 A1 * 9/2013 Thakkar .................. G06F 1/266 713/300
2014/0201471 A1 * 7/2014 Cutter ................. G06F 13/1663 711/151
2014/0375658 A1 12/2014 Lichmanov et al.
2015/0032278 A1 * 1/2015 Bhageria ............. H02J 13/0017 700/295
2015/0046679 A1 * 2/2015 Gathala ................. G06F 9/4552 712/30
2015/0220461 A1 * 8/2015 Auernhammer .... G06F 13/4027 710/310
2015/0339245 A1 * 11/2015 Chakraborty ....... G06F 13/1626 711/158
2016/0011914 A1 * 1/2016 Bohn .................... G06F 9/5094 713/300
2016/0378168 A1 12/2016 Branover et al.
2017/0031955 A1 * 2/2017 Kenchammana-Hosekote ............ H04L 67/1097

OTHER PUBLICATIONS

Majumdar, et al., U.S. Appl. No. 15/192,784, entitled "Temperature-Aware Task Scheduling and Proactive Power Management", filed Jun. 24, 2016, 35 pages.

International Search Report and Written Opinion in International Application No. PCT/US2017/042428, mailed Feb. 22, 2018, 10 pages.

* cited by examiner

DYNAMIC MEMORY POWER CAPPING WITH CRITICALITY AWARENESS

The invention described herein was made with government support under contract number DE-AC52-07NA27344 awarded by the United States Department of Energy. The United States Government has certain rights in the invention.

BACKGROUND

Description of the Related Art

During the design of a computer or other processor-based system, many design factors must be considered. A successful design may require a variety of tradeoffs between power consumption, performance, thermal output, and so on. For example, the design of a computer system with an emphasis on high performance may allow for greater power consumption and thermal output. Conversely, the design of a portable computer system that is sometimes powered by a battery may emphasize reducing power consumption at the expense of some performance. Whatever the particular design goals, a computing system typically has a given amount of power available to it during operation. This power must be allocated amongst the various components within the system—a portion is allocated to the processor(s), another portion to the memory subsystem, and so on. How the power is allocated amongst the system components may also change during operation.

While it is understood that power must be allocated within a system, how the power is allocated can significantly affect system performance. For example, if too much of the system power budget is allocated to the memory, then the processors may not have an adequate power budget to execute pending instructions and performance of the system may suffer. Conversely, if the processors are allocated too much of the power budget and the memory subsystem not enough, then servicing of memory requests may be delayed which in turn may cause stalls within the processor(s) and decrease system performance.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
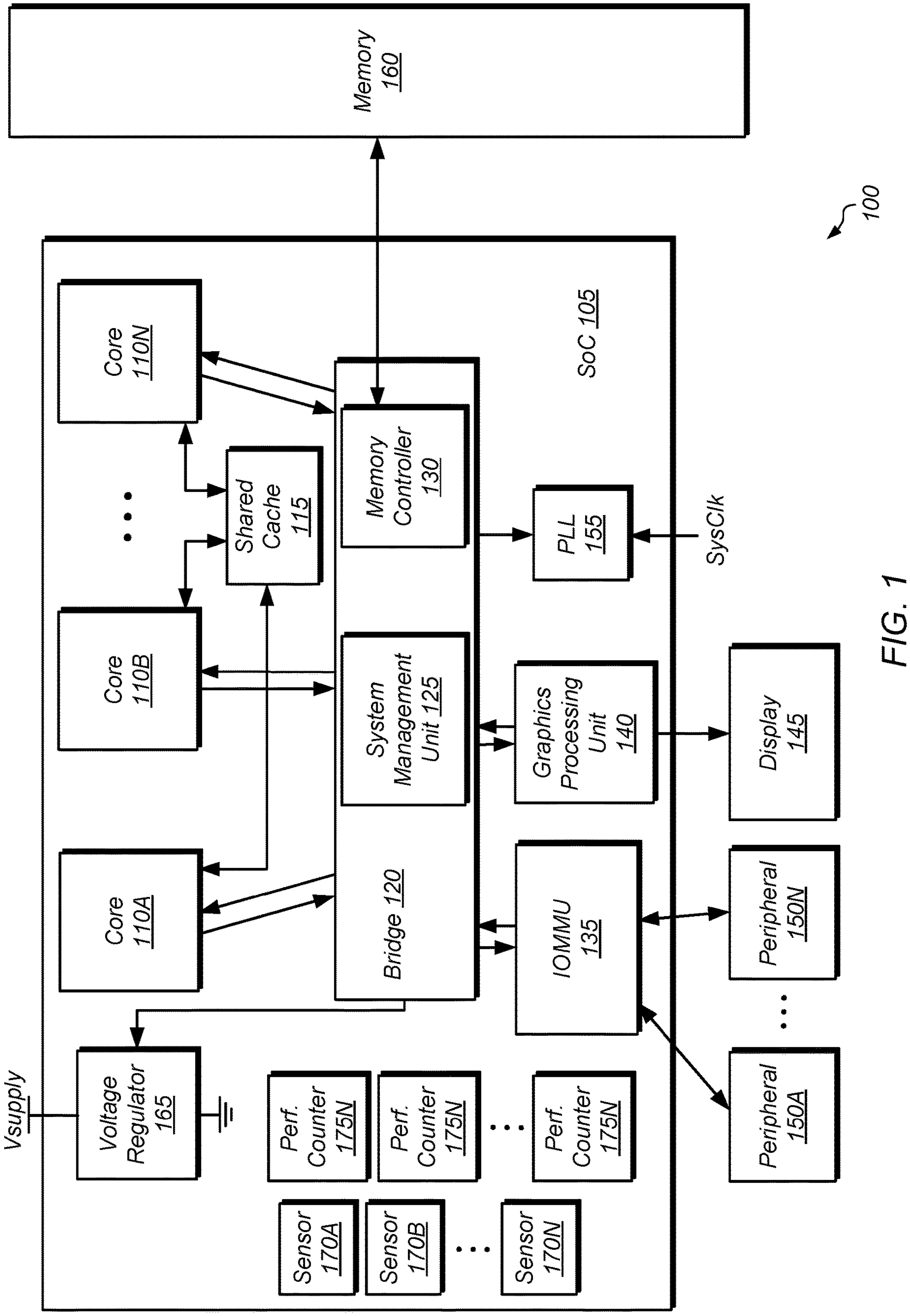
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for allocating memory in a computing system are disclosed. A system management unit reduces power allocated to a memory subsystem responsive to detecting a first condition. In one embodiment, the first condition is detecting one or more processors have tasks to execute (e.g., scheduled or otherwise pending tasks) and are operating at a reduced rate due to a current power budget. In another embodiment, the first condition also includes detecting the memory controller currently has a threshold number of non-critical memory requests (also referred to herein as non-critical requests) stored in a pending request queue. In response to a transfer of a portion of a power budget from the memory subsystem to one or more processors, the memory controller delays the non-critical memory requests while performing critical memory requests to memory. In various embodiments, memory requests are identified as critical or non-critical by the processor(s), and this criticality information is conveyed from the processor(s) to the memory controller.

In one embodiment, the system management unit is configured to allocate a first power budget to a memory subsystem and a second power budget to one or more processors. In one embodiment, the system management unit reduces the first power budget of the memory subsystem by transferring a first portion of the first power budget from the memory subsystem to the one or more processors responsive to determining the one or more processors have tasks to execute and can increase performance from an increased power budget. In one embodiment, the first portion of the first power budget that is transferred is inversely proportional to a number of critical memory requests stored in the pending request queue of the memory controller. In another embodiment, the first portion of the first power budget that is transferred can be determined based on a number of tasks that the processor(s) have to execute, if the processor(s) are operating below their nominal voltage level, and if the memory's consumed bandwidth is above a preset threshold. For example, in one embodiment, a formula can be utilized to determine how much power to transfer from the memory subsystem to the processor(s) with multiple components (e.g., a number of pending tasks, processor's current voltage level, memory's consumed bandwidth) contributing to the formula and with a different weighting factor applied to each component.

In one embodiment, the memory controller receives an indication of the reduced power budget. In response to receiving this indication, the memory controller is configured to enter a mode of operation in which it prioritizes critical memory requests over non-critical memory requests. While operating in this mode, non-critical memory requests are delayed while there are critical memory requests (also referred to herein as critical requests) that need to be serviced. In one embodiment, the memory controller converts the reduced power budget into a number of requests that may be issued within a given period of time. For example, in one embodiment the memory controller converts a given power budget into a number of memory requests that may be issued per second, or an average number of requests that may be issued over a given period of time. Then, the memory controller limits the number of memory requests performed per second to the first number of memory requests per second. The memory controller prioritizes performing critical requests to memory, and if the memory controller has not reached the first number after performing all pending critical requests, then the memory controller can perform non-critical requests to memory. Also, the memory controller can adjust the first number based on various factors such as a row buffer hit rate, allowing the memory controller to perform more memory requests during the given period of time as the row buffer hit rate increases while still complying with its allocated power budget. In another embodiment, the memory controller can also adjust the first number based on a number of requests that are pending in the queue for at least a threshold amount of time (e.g., "N" cycles). Depending on the embodiment, the threshold "N" can be set statically at design time by system software or the threshold "N' can be set dynamically by hardware.

When the system management unit detects an exit condition for exiting the reduced power mode for the memory subsystem, the system management unit reallocates power back to the memory subsystem from the processor(s) and the memory controller returns to its default mode. In one embodiment, the exit condition is detecting that the processor(s) no longer have tasks to execute. In another embodiment, the exit condition is detecting the total number of pending requests or the number of pending critical requests in the memory controller is above a threshold. In other embodiments, other exit conditions can be utilized.

Referring now to FIG. 1, a block diagram of one embodiment of a computing system 100 is shown. In this embodiment, computing system 100 includes system on chip (SoC) 105 coupled to memory 160. SoC 105 may also be referred to as an integrated circuit (IC). In some embodiments, SoC 105 includes a plurality of processor cores 110A-N and graphics processing unit (GPU) 140. It is noted that processor cores 110A-N can also be referred to as processing units or processors. Processor cores 110A-N and GPU 140 are configured to execute instructions of one or more instruction set architectures (ISAs), which can include operating system instructions and user application instructions. These instructions include memory access instructions which can be translated and/or decoded into memory access requests or memory access operations targeting memory 160.

In another embodiment, SoC 105 includes a single processor core 110. In multi-core embodiments, processor cores 110 can be identical to each other (i.e., symmetrical multi-core), or one or more cores can be different from others (i.e., asymmetric multi-core). Each processor core 110 includes one or more execution units, cache memories, schedulers, branch prediction circuits, and so forth. Furthermore, each of processor cores 110 is configured to assert requests for access to memory 160, which functions as main memory for computing system 100. Such requests include read requests and/or write requests, and are initially received from a respective processor core 110 by bridge 120. Each processor core 110 can also include a queue or buffer that holds in-flight instructions that have not yet completed execution. This queue can be referred to herein as an "instruction queue". Some of the instructions in a processor core 110 can still be waiting for their operands to become available, while other instructions can be waiting for an available arithmetic logic unit (ALU). The instructions which are waiting on an available ALU can be referred to as pending ready instructions. In one embodiment, each processor core 110 is configured to track the number of pending ready instructions.

Each request generated by processor cores 110 can also include an indication of whether the request is a critical or non-critical request. In one embodiment, each of processor cores 110 is configured to specify a criticality indication for each generated request. In one embodiment, a critical (memory) request is defined as a request that has at least N dependent instructions, a request with a program counter (PC) that matches a previous PC that caused a stall of at least N cycles, a request issued by a thread that holds a lock, and/or a request issued by the last thread that has not yet reached a synchronization point. It is noted that the value of N can vary for these different conditions. In other embodiments, other requests may be deemed critical based on a likelihood they will negatively impact performance (i.e., reduce performance) if they are delayed. In some embodiments, critical requests can be identified and marked by a programmer or system software through code analysis or using profiled data that analyzes memory requests that directly impact performance. A non-critical request is defined as a request that is not deemed or otherwise categorized as a critical request. In other embodiments, other definitions of critical and non-critical requests can be utilized. Memory controller 130 is configured to prioritize performing critical requests to memory 160 while delaying non-critical requests when operating under a power cap imposed by system management unit 125.

Input/output memory management unit (IOMMU) 135 is coupled to bridge 120 in the embodiment shown. In one embodiment, bridge 120 functions as a northbridge device and IOMMU 135 functions as a southbridge device in computing system 100. In other embodiments, bridge 120 can be a fabric, switch, bridge, any combination of these components, or another component. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) can be coupled to IOMMU 135. Various types of peripheral devices 150A-N can be coupled to some or all of the peripheral buses. Such peripheral devices 150A-N include (but are not limited to) keyboards, mice, printers, scanners, joysticks or other types of game controllers, media recording devices, external storage devices, network interface cards, and so forth. At least some of the peripheral devices 150A-N that are coupled to IOMMU 135 via a corresponding peripheral bus can assert memory access requests using direct memory access (DMA). These requests (which can include read and write requests) are conveyed to bridge 120 via IOMMU 135.

In some embodiments, SoC 105 includes a graphics processing unit (GPU) 140 that is coupled to display 145 of computing system 100. In some embodiments, GPU 140 is an integrated circuit that is separate and distinct from SoC 105. Display 145 can be a flat-panel LCD (liquid crystal display), plasma display, a light-emitting diode (LED) display, or any other suitable display type. GPU 140 performs various video processing functions and provides the processed information to display 145 for output as visual information. GPU 140 can also be configured to perform other types of tasks scheduled to GPU 140 by an application scheduler. GPU 140 includes a number 'N' of compute units for executing tasks of various applications or processes, with 'N' a positive integer. The 'N' compute units of GPU 140 may also be referred to as "processing units". Each compute unit of GPU 140 is configured to assert requests for access to memory 160, and each compute unit is configured to specify if a given request is a critical or non-critical request. A request can be identified as critical using any of the definitions of critical requests included herein.

In one embodiment, memory controller 130 is integrated into bridge 120. In other embodiments, memory controller 130 is separate from bridge 120. Memory controller 130 receives memory requests conveyed from bridge 120, and each request can include an indication identifying the request as critical or non-critical. Data accessed from memory 160 responsive to a read request is conveyed by memory controller 130 to the requesting agent via bridge 120. Responsive to a write request, memory controller 130 receives both the request and the data to be written from the requesting agent via bridge 120. If multiple memory access requests are pending at a given time, memory controller 130 arbitrates between these requests. For example, memory controller 130 can give priority to critical requests while delaying non-critical requests when the power budget allocated to memory controller 130 restricts the total number of requests that can be performed to memory 160.

In some embodiments, memory 160 includes a plurality of memory modules. Each of the memory modules includes one or more memory devices (e.g., memory chips) mounted thereon. In some embodiments, memory 160 includes one or more memory devices mounted on a motherboard or other carrier upon which SoC 105 is also mounted. In some embodiments, at least a portion of memory 160 is implemented on the die of SoC 105 itself. Embodiments having a combination of the aforementioned embodiments are also possible and contemplated. In one embodiment, memory 160 is used to implement a random access memory (RAM) for use with SoC 105 during operation. The RAM implemented can be static RAM (SRAM) or dynamic RAM (DRAM). The type of DRAM that is used to implement memory 160 includes (but are not limited to) double data rate (DDR) DRAM, DDR2 DRAM, DDR3 DRAM, and so forth.

Although not explicitly shown in FIG. 1, SoC 105 can also include one or more cache memories that are internal to the processor cores 110. For example, each of the processor cores 110 can include an L 1 data cache and an L 1 instruction cache. In some embodiments, SoC 105 includes a shared cache 115 that is shared by the processor cores 110. In some embodiments, shared cache 115 is a level two (L2) cache. In some embodiments, each of processor cores 110 has an L2 cache implemented therein, and thus shared cache 115 is a level three (L3) cache. Cache 115 can be part of a cache subsystem including a cache controller.

In one embodiment, system management unit 125 is integrated into bridge 120. In other embodiments, system management unit 125 can be separate from bridge 120 and/or system management unit 125 can be implemented as multiple, separate components in multiple locations of SoC 105. System management unit 125 is configured to manage the power states of the various processing units of SoC 105. System management unit 125 may also be referred to as a power management unit. In one embodiment, system management unit 125 uses dynamic voltage and frequency scaling (DVFS) to change the frequency and/or voltage of a processing unit to limit the processing unit's power consumption to a chosen power allocation.

SoC 105 includes multiple temperature sensors 170A-N, which are representative of any number of temperature sensors. It should be understood that while sensors 170A-N are shown on the left-side of the block diagram of SoC 105, sensors 170A-N can be spread throughout the SoC 105 and/or can be located next to the major components of SoC 105 in the actual implementation of SoC 105. In one embodiment, there is a sensor 170A-N for each core 110A-N, compute unit of GPU 140, and other major components. In this embodiment, each sensor 170A-N tracks the temperature of a corresponding component. In another embodiment, there is a sensor 170A-N for different geographical regions of SoC 105. In this embodiment, sensors 170A-N are spread throughout SoC 105 and located so as to track the temperatures in different areas of SoC 105 to monitor whether there are any hot spots in SoC 105. In other embodiments, other schemes for positioning the sensors 170A-N within SoC 105 are possible and are contemplated.

SoC 105 also includes multiple performance counters 175A-N, which are representative of any number and type of performance counters. It should be understood that while performance counters 175A-N are shown on the left-side of the block diagram of SoC 105, performance counters 175A-N can be spread throughout the SoC 105 and/or can be located within the major components of SoC 105 in the actual implementation of SoC 105. For example, in one embodiment, each core 110A-N includes one or more performance counters 175A-N, memory controller 140 includes one or more performance counters 175A-N, GPU 140 includes one or more performance counters 175A-N, and other performance counters 175A-N are utilized to monitor the performance of other components. Performance counters 175A-N can track a variety of different performance metrics, including the instruction execution rate of cores 110A-N and GPU 140, consumed memory bandwidth, row buffer hit rate, cache hit rates of various caches (e.g., instruction cache, data cache), and/or other metrics.

In one embodiment, SoC 105 includes a phase-locked loop (PLL) unit 155 coupled to receive a system clock signal. PLL unit 155 includes a number of PLLs configured to generate and distribute corresponding clock signals to each of processor cores 110 and to other components of SoC 105. In one embodiment, the clock signals received by each of processor cores 110 are independent of one another. Furthermore, PLL unit 155 in this embodiment is configured to individually control and alter the frequency of each of the clock signals provided to respective ones of processor cores 110 independently of one another. The frequency of the clock signal received by any given one of processor cores 110 can be increased or decreased in accordance with power states assigned by system management unit 125. The various frequencies at which clock signals are output from PLL unit 155 correspond to different operating points for each of processor cores 110. Accordingly, a change of operating point for a particular one of processor cores 110 is put into effect by changing the frequency of its respectively received clock signal.

An operating point for the purposes of this disclosure can be defined as a clock frequency, and can also include an operating voltage (e.g., supply voltage provided to a functional unit). Increasing an operating point for a given functional unit can be defined as increasing the frequency of a clock signal provided to that unit, and can also include increasing its operating voltage. Similarly, decreasing an operating point for a given functional unit can be defined as decreasing the clock frequency, and can also include decreasing the operating voltage. Limiting an operating point can be defined as limiting the clock frequency and/or operating voltage to specified maximum values for particular set of conditions (but not necessarily maximum limits for all conditions). Thus, when an operating point is limited for a particular processing unit, it can operate at a clock frequency and operating voltage up to the specified values for a current set of conditions, but can also operate at clock frequency and operating voltage values that are less than the specified values.

In the case where changing the respective operating points of one or more processor cores 110 includes changing of one or more respective clock frequencies, system management unit 125 changes the state of digital signals provided to PLL unit 155. Responsive to the change in these signals, PLL unit 155 changes the clock frequency of the affected processing core(s) 110. Additionally, system management unit 125 can also cause PLL unit 155 to inhibit a respective clock signal from being provided to a corresponding one of processor cores 110.

In the embodiment shown, SoC 105 also includes voltage regulator 165. In other embodiments, voltage regulator 165 can be implemented separately from SoC 105. Voltage regulator 165 provides a supply voltage to each of processor cores 110 and to other components of SoC 105. In some embodiments, voltage regulator 165 provides a supply voltage that is variable according to a particular operating point. In some embodiments, each of processor cores 110 shares a voltage plane. Thus, each processing core 110 in such an embodiment operates at the same voltage as the other ones of processor cores 110. In another embodiment, voltage planes are not shared, and thus the supply voltage received by each processing core 110 is set and adjusted independently of the respective supply voltages received by other ones of processor cores 110. Thus, operating point adjustments that include adjustments of a supply voltage can be selectively applied to each processing core 110 independently of the others in embodiments having non-shared voltage planes. In the case where changing the operating point includes changing an operating voltage for one or more processor cores 110, system management unit 125 changes the state of digital signals provided to voltage regulator 165. Responsive to the change in the signals, voltage regulator 165 adjusts the supply voltage provided to the affected ones of processor cores 110. In instances when power is to be removed from (i.e., gated) one of processor cores 110, system management unit 125 sets the state of corresponding ones of the signals to cause voltage regulator 165 to provide no power to the affected processing core 110.

In various embodiments, computing system 100 can be a computer, laptop, mobile device, server, web server, cloud computing server, storage system, or any of various other types of computing systems or devices. It is noted that the number of components of computing system 100 and/or SoC 105 can vary from embodiment to embodiment. There can be more or fewer of each component/subcomponent than the number shown in FIG. 1. It is also noted that computing system 100 and/or SoC 105 can include other components not shown in FIG. 1. Additionally, in other embodiments, computing system 100 and SoC 105 can be structured in other ways than shown in FIG. 1.

Figure 2:
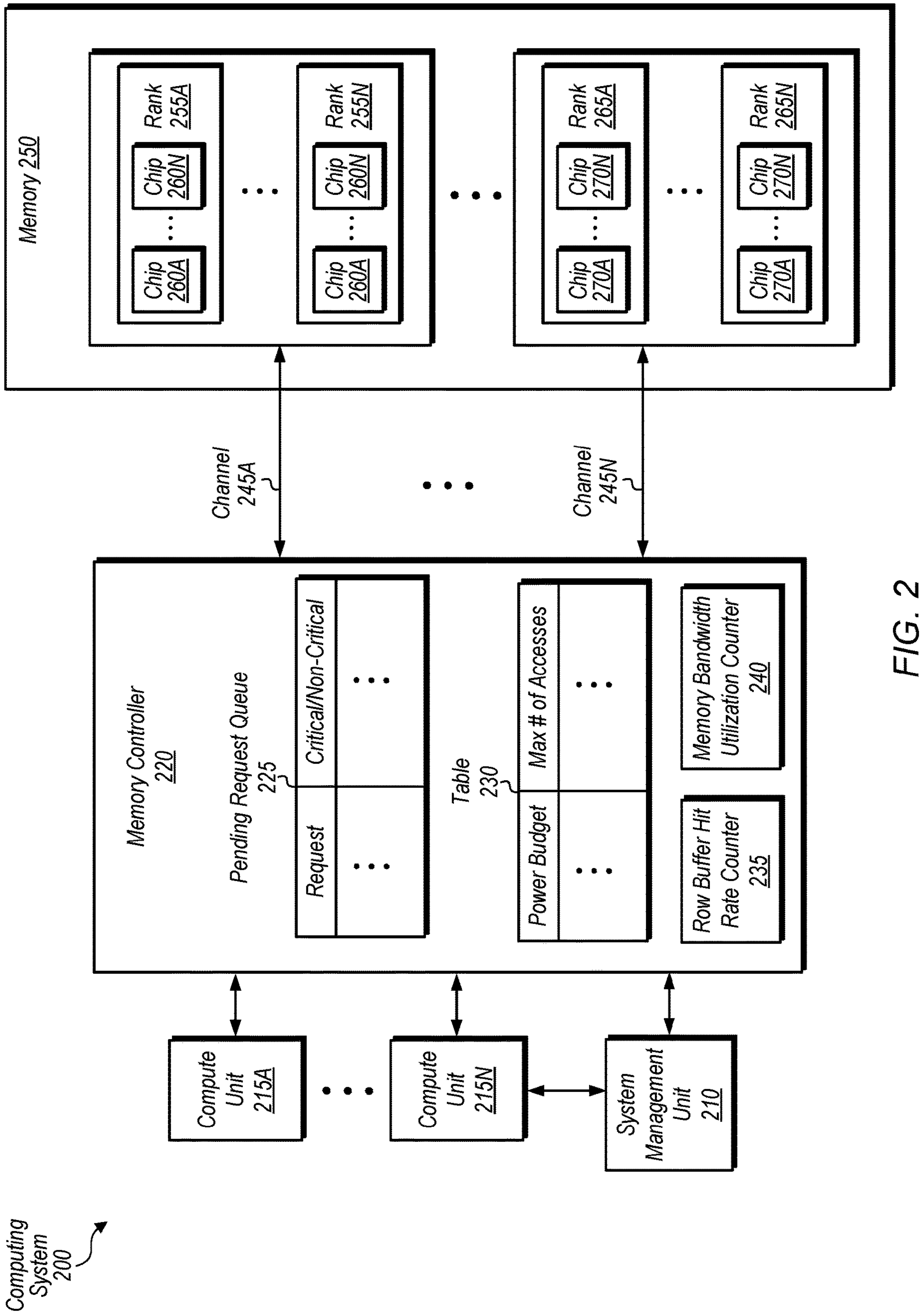
FIG. 2 is a block diagram of another embodiment of a computing system.

Turning now to FIG. 2, a block diagram of another embodiment of a computing system 200 is shown. Computing system 200 includes system management unit 210, compute units 215A-N, memory controller 220, and memory 250. Compute units 215A-N are representative of any number and type of compute units (e.g., CPU, GPU, accelerator). In various embodiments, one or more of compute units 215A-N can be implemented in a separate package from memory 250 or in a processing-near-memory architecture implemented in the same package as memory 250. It is noted that compute units 215A-N may also be referred to as processors or processing units.

Compute units 215A-N are coupled to memory controller 220. Although not shown in FIG. 2, one or more units can be placed in between compute units 215A-N and memory controller 220. These units can include a fabric, bridge, northbridge, or other components. Compute units 215A-N are configured to generate memory access requests targeting memory 250. Compute units 215A-N and/or other logic within system 200 is configured to generate indications for memory access requests identifying each request as critical or non-critical. Memory access requests are conveyed from compute units 215A-N to memory controller 220. Memory controller 220 can store a critical/non-critical indicator in pending request queue 225 for each pending memory request. Requests are conveyed from memory controller 220 to memory 250 via channels 245A-N. In one embodiment, memory 250 is used to implement a RAM. The RAM implemented can be SRAM or DRAM.

Channels 245A-N are representative of any number of memory channels for accessing memory 250. On channel 245A, each rank 255A-N of memory 250 includes any number of chips 260A-N with any amount of storage capacity, depending on the embodiment. Each chip 260A-N of ranks 255A-N includes any number of banks, with each bank including any number of storage locations. Similarly, on channel 245N, each rank 265A-N of memory 250 includes any number of chips 270A-N with any amount of storage capacity. In other embodiments, the structure of memory 250 can be organized differently among ranks, chips, banks, etc.

In the embodiment shown, memory controller 220 includes a pending request queue 225, table 230, row buffer hit rate counter 235, and memory bandwidth utilization counter 240. Memory controller 220 stores received memory requests in pending request queue 225 until memory controller 220 is able to perform the memory requests to memory 250. System management unit 210 sends a power budget to memory controller 220, and memory controller 220 utilizes table 230 to convert the power budget into a maximum number of accesses that can be performed to memory 250 per second. In other embodiments, the maximum number of accesses can be indicated for other units of time rather than per second. Also, in some embodiments, memory controller 220 utilizes the status of the DRAM (as indicated by row buffer hit rate counter 235) to adjust the maximum number of accesses that can be performed per unit of time. For example, memory controller 220 can allow pending critical and non-critical requests to issue to a currently open DRAM row as long as a given memory-power constraint is being met. Such an approach can help improve the overall row buffer hit rate.

In one embodiment, table 230 is programmed during design time (e.g., using the data sheet of the provisioned memory device implemented as memory 250). Alternatively, table 230 is programmable after manufacture. Once the service rate is identified for a given power budget, memory controller 220 checks pending request queue 225 and issues requests to memory 250, without exceeding the rate limit, by giving priorities to the following request types:

(1) Performance-critical requests.

(2) An age of pending requests. For example, requests that are pending in queue 225 for at least N cycles, with N a positive integer which can vary from embodiment to embodiment. The threshold N can be set statically at design time, by system software, or dynamically by control logic in memory controller 220.

(3) Requests to an open DRAM row in memory 250 as long as the above two request types can be issued.

If the service-rate threshold is still not met after giving priority to the above three request types, then memory controller 220 can issue as many remaining requests as possible. Performance-critical requests can be identified and marked by a programmer or system software through code analysis or using profile data that analyzes memory requests that directly impact performance. It is noted that the terms "performance-critical" and "critical" may be used interchangeably throughout this disclosure. The criticality of a memory request can also be predicted at runtime using one or more of the following conditions (it is noted that N is used to denote thresholds below and N need not be the same across all conditions):

(1) There are at least N dependent instructions on the memory request.

(2) The program counter (PC) of the memory request matches a previous PC that caused a stall of more than N cycles.

(3) The memory request is issued by a thread that holds a lock.

(4) The memory request is issued by the last thread that has not yet reached a synchronization point.

In one embodiment, memory controller 220 conveys indications of how many critical requests are currently stored in queue 225 and how many non-critical requests are currently stored in queue 225 to system management unit 210. In one embodiment, memory controller 220 also conveys an indication of the memory bandwidth utilization from memory bandwidth utilization counter 240 to system management unit 210. System management unit 210 can utilize the numbers of critical and non-critical requests and the memory bandwidth utilization to determine how to allocate power budgets for the compute units 215A-N and memory controller 220. System management unit 210 can also utilize information regarding whether compute units 215A-N have tasks to execute and the current operating points of compute units 215A-N to determine how to allocate power budgets for the compute units 215A-N and memory controller 220. For example, in one embodiment, if compute units 215A-N have tasks to execute and compute units 215A-N are operating below a nominal operating point, then system management unit 210 can shift power from the memory subsystem to one or more of compute units 215A-N.

Figure 3:
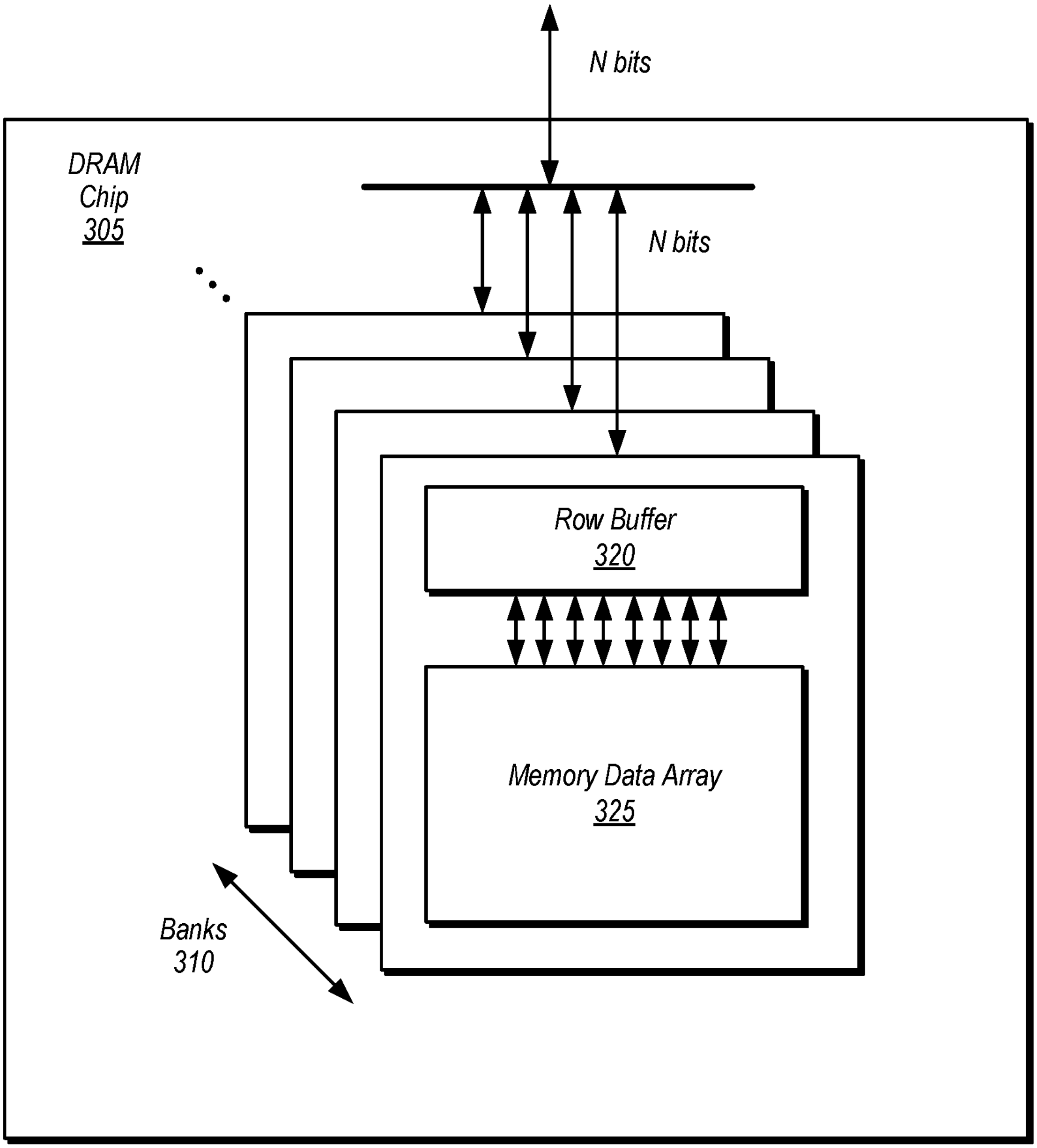
FIG. 3 is a block diagram of one embodiment of a DRAM chip.

Referring now to FIG. 3, a block diagram of one embodiment of a DRAM chip 305 is shown. In one embodiment, the components shown within DRAM chip 305 are included within chips 260A-N and chips 270A-N of memory 250 (of FIG. 2). DRAM chip 305 includes an N-bit external interface, and DRAM chip 305 includes an N-bit interface to each bank of banks 310, with N being any positive integer, and with N varying from embodiment to embodiment. In some cases, N is a power of two (e.g., 8, 16). Additionally, banks 310 are representative of any number of banks which can be included within DRAM chip 305, with the number of banks varying from embodiment to embodiment.

As shown in FIG. 3, each bank 310 includes a memory data array 325 and a row buffer 320. The width of the interface between memory data array 325 and row buffer 320 is typically wider than the width of the N-bit interface out of chip 305. Accordingly, if multiple hits can be performed to row buffer 320 after a single access to memory data array 325, this can increase the efficiency and decrease latency of subsequent memory access operations performed to the same row of memory array 325. However, there is a write penalty when writing the contents of row buffer 320 back to memory data array 325 prior to performing an access to another row of memory data array 325.

Figure 4:
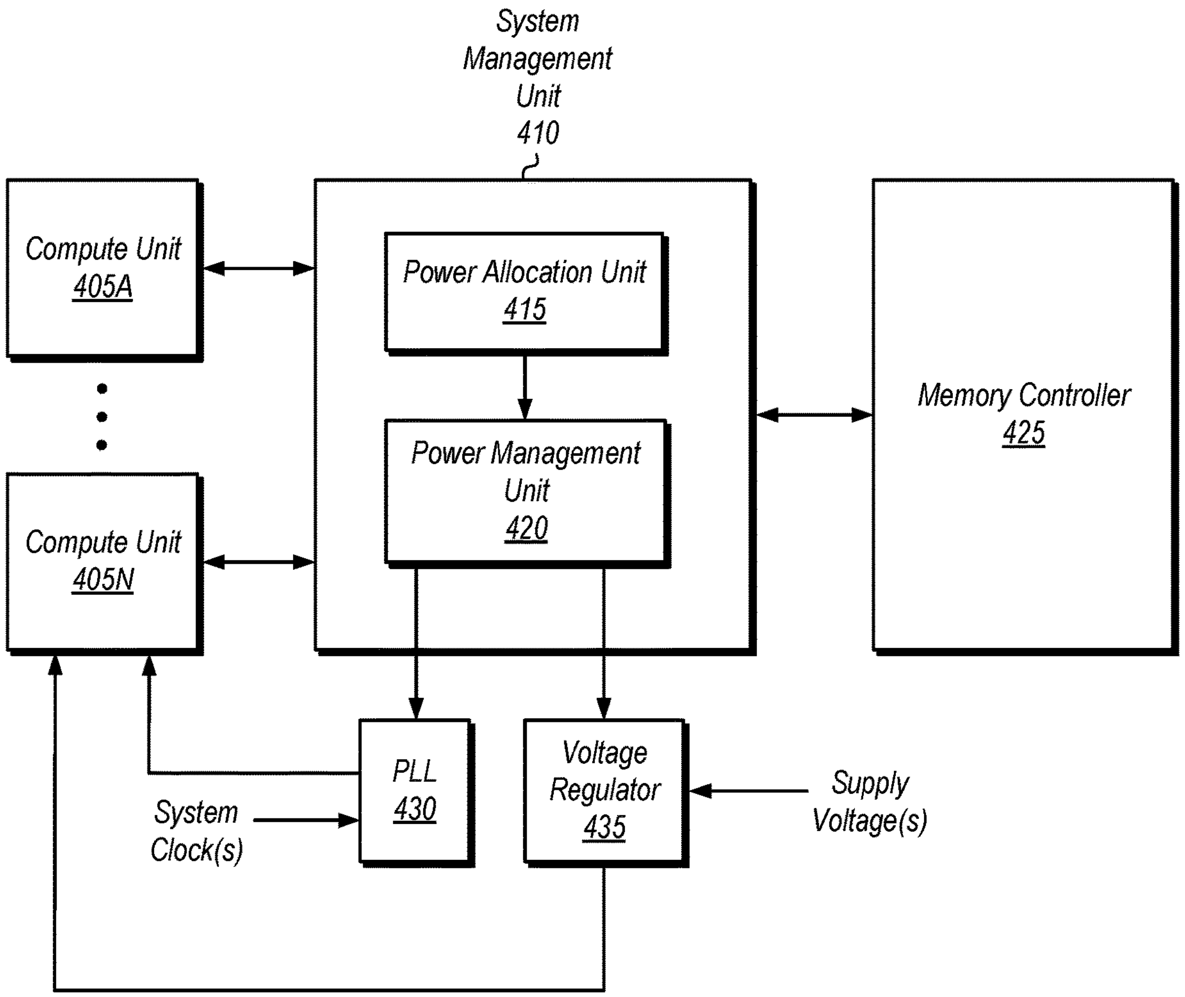
FIG. 4 is a block diagram of one embodiment of a system management unit.

Turning now to FIG. 4, a block diagram of one embodiment of a system management unit 410 is shown. System management unit 410 is coupled to compute units 405A-N, memory controller 425, phase-locked loop (PLL) unit 430, and voltage regulator 435. System management unit 410 can also be coupled to one or more other components not shown in FIG. 4. Compute units 405A-N are representative of any number and type of compute units, and compute units 405A-N may also be referred to as processors or processing units.

System management unit 410 includes power allocation unit 415 and power management unit 420. Power allocation unit 415 is configured to allocate a power budget to each of compute units 405A-N, to a memory subsystem including memory controller 425, and/or to one or more other components. The total amount of power available to power allocation unit 415 to be dispersed to the components can be capped for the host system or apparatus. Power allocation unit 415 receives various inputs from compute units 405A-N including a status of the miss status holding registers (MSHRs) of compute units 405A-N, the instruction execution rates of compute units 405A-N, the number of pending ready-to-execute instructions in compute units 405A-N, the instruction and data cache hit rates of compute units 405A-N, the consumed memory bandwidth, and/or one or more other input signals. Power allocation unit 415 can utilize these inputs to determine whether compute units 405A-N have tasks to execute, and then power allocation unit 415 can adjust the power budget allocated to compute units 405A-N according to these determinations. Power allocation unit 415 can also receive inputs from memory controller 425, with these inputs including the consumed memory bandwidth, number of total requests in the pending request queue, number of critical requests in the pending request queue, number of non-critical requests in the pending request queue, and/or one or more other input signals. Power allocation unit 415 can utilize the status of these inputs to determine the power budget that is allocated to the memory subsystem.

PLL unit 430 receives system clock signal(s) and includes any number of PLLs configured to generate and distribute corresponding clock signals to each of compute units 405A-N and to other components. Power management unit 420 is configured to convey control signals to PLL unit 430 to control the clock frequencies supplied to compute units 405A-N and to other components. Voltage regulator 435 provides a supply voltage to each of compute units 405A-N and to other components. Power management unit 420 is configured to convey control signals to voltage regulator 435 to control the voltages supplied to compute units 405A-N and to other components.

Memory controller 425 is configured to control the memory (not shown) of the host computing system or apparatus. For example, memory controller 425 issues read, write, erase, refresh, and various other commands to the memory. In one embodiment, memory controller 425 includes the components of memory controller 220 (of FIG. 2). When memory controller 425 receives a power budget from system management unit 410, memory controller 425 converts the power budget into a number of memory requests per second that the memory controller 425 is allowed to perform to memory. The number of memory requests per second is enforced by memory controller 425 to ensure that memory controller 425 stays within the power budget allocated to the memory subsystem by system management unit 410. The number of memory requests per second can also take into account the status of the DRAM to allow memory controller 425 to issue pending critical and non-critical requests to a currently open DRAM row as long as a given memory-power constraint is being met. Memory controller 425 prioritizes processing critical requests without exceeding the requests per second which memory controller 425 is allowed to perform. If all critical requests have been processed and memory controller 425 has not reached the specified requests per second limit, then memory controller 425 processes non-critical requests.

Figure 5:
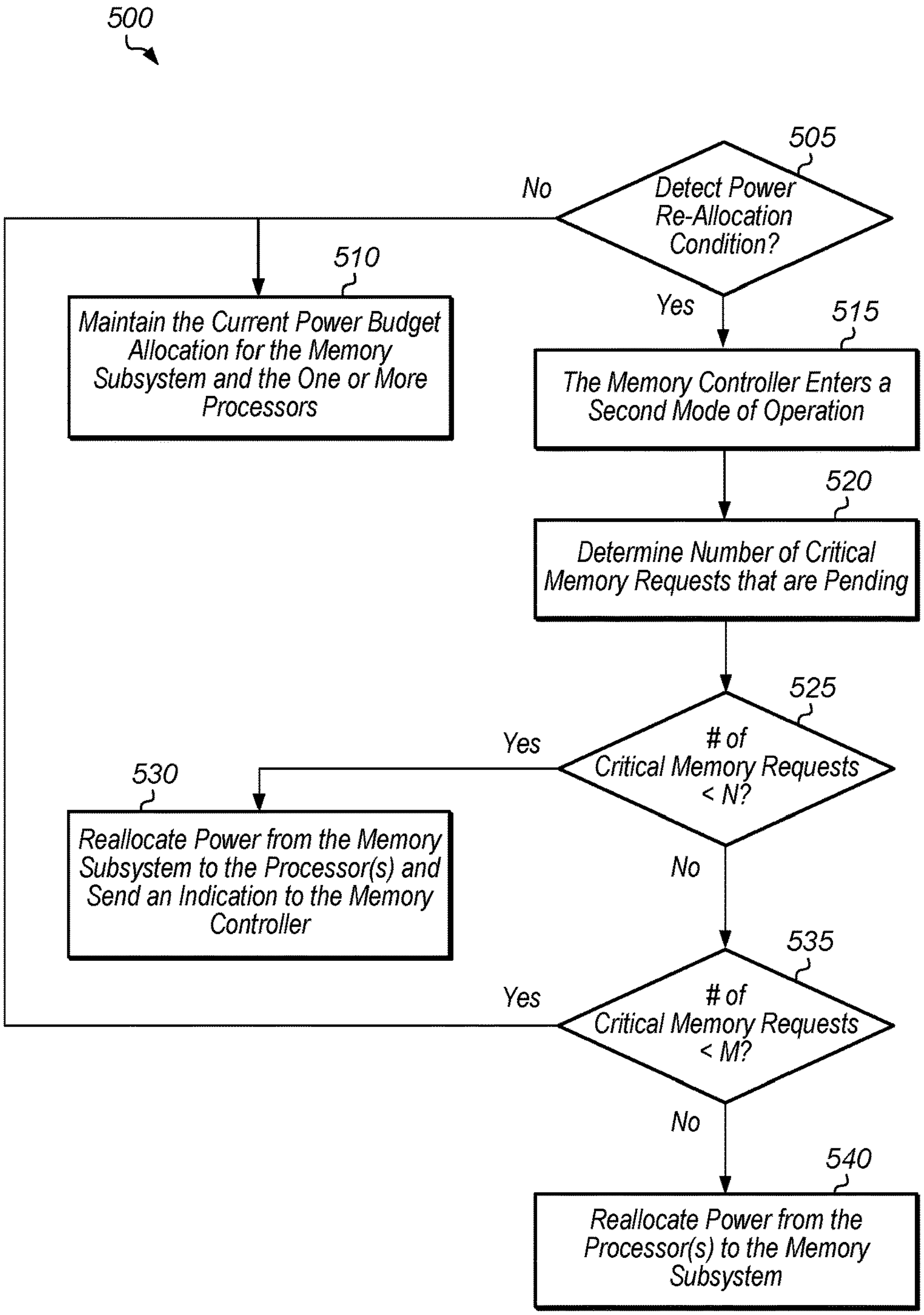
FIG. 5 is a generalized flow diagram illustrating one embodiment of a method for allocating power budgets to system components.
Figure 6:
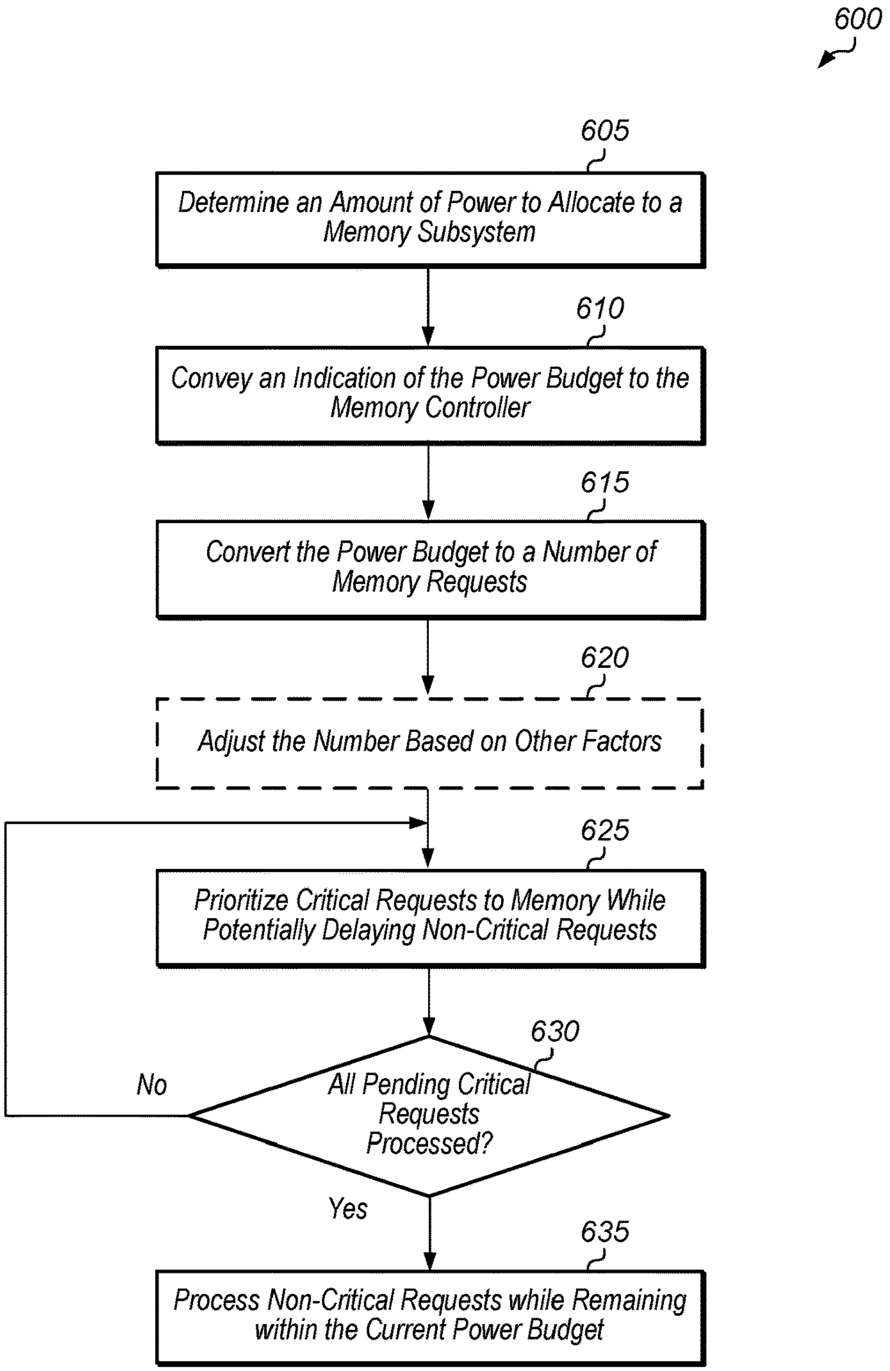
FIG. 6 is a generalized flow diagram illustrating one embodiment of a method for modifying memory controller operation responsive to a reduced power budget.
Figure 7:
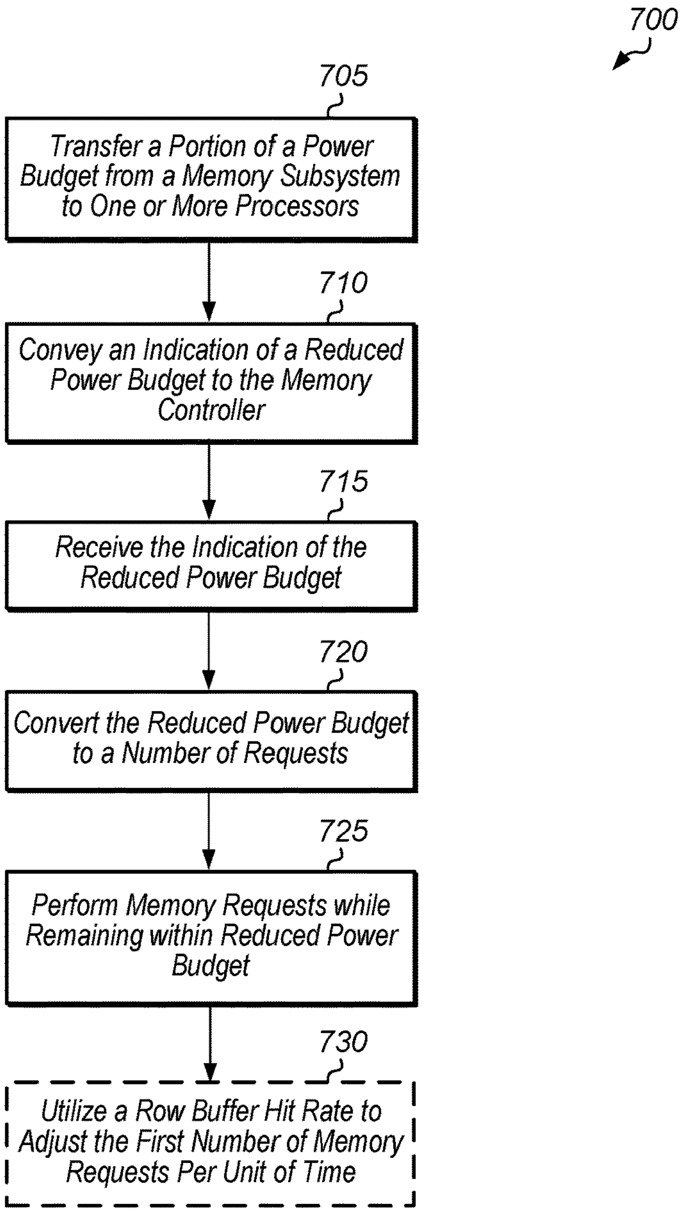
FIG. 7 is a generalized flow diagram illustrating one embodiment of a method for transferring a portion of a power budget between system components.

Referring now to FIG. 5, one embodiment of a method 500 for allocating power budgets to system components is shown. For purposes of discussion, the steps in this embodiment and those of FIGS. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

In the example shown, a system management unit determines whether a power re-allocation condition is detected in which power is to be re-allocated amongst system components by removing power from the memory subsystem and re-allocating it to processor(s) within this system (conditional block 505). In one embodiment, if a system management unit (or other unit or logic within the system) has determined that the processor(s) currently have work pending (e.g., instructions to execute), but are operating at a reduced rate due to a power budget constraint, then power is reallocated. For example, in one embodiment, a processor is configured to operate at multiple power performance states. Given an ample power budget, the processor is able to operate at a higher power performance state and complete work at a faster rate. However, given a reduced power budget, the processor can be limited to a lower power performance state which results in work being completed at a slower rate. In some cases, if the memory controller has a number of pending critical memory requests that is greater than a threshold or greater than the number of pending processor tasks, then the system management unit can prevent power from being allocated away from the memory subsystem since doing so might cause performance degradation due to lower memory throughput.

In one embodiment, the system management unit receives indication(s) specifying whether one or more processors have tasks to execute so as to determine whether to trigger the power reallocation condition. Depending on the embodiment, the indication(s) can be retrieved from, or based on, performance counters or other data structures tracking the performance of the one or more processors. For example, the system management unit receives indications regarding the status of the miss status holding register (MSHR) to see how quickly the MSHR is being filled. Also, the system management unit can monitor how many instructions are pending and ready to execute (in instructions queues, buffers, etc.). In one embodiment, pending ready instructions are instructions which are waiting for an available arithmetic logic unit (ALU). Still further, the system management unit can monitor performance counter(s) associated with the compute rate and/or instruction execution rate of the one or more processors. Based at least in part on these inputs, the system management unit determines whether the one or more processors have tasks to execute. In other embodiments, the system management unit can utilize one or more of the above inputs and/or one or more other inputs to determine whether the one or more processors have tasks to execute.

If a power re-allocation condition is not detected (conditional block 505, “no” leg), then a current allocation can be maintained and the memory controller can continue in its current mode of operation (block 510). In one embodiment, the current mode of operation can be considered a default mode of operation (i.e., a “first” mode of operation). While operating in this default mode, the memory controller can generally process memory requests in an order in which they are received. During the default mode of operation, an initial power budget allocated to the memory controller can be a statically set power budget or based on a number of pending requests without regard to whether the requests are deemed critical or non-critical. In another embodiment, the current mode of operation can be a power-shifting mode if power was previously shifted based on detecting a power re-allocation condition during a prior iteration through method 500. If, on the other hand, a power re-allocation condition is detected (conditional block 505, “yes” leg), the memory controller can enter a second mode of operation (block 515).

In the second mode of operation, the system management unit determines how many critical memory requests are stored in the pending request queue of the memory controller (block 520). If the number of critical memory requests stored in the pending request queue of the memory controller is less than a first threshold “N” (conditional block 525, “yes” leg), then the system management unit reallocates power from the memory subsystem to the one or more processors and sends an indication of this reallocation to the memory controller (block 530). In one embodiment, the system management unit increases the power budget allocated to the one or more processors by an amount inversely proportional to the number of critical memory requests stored in the pending request queue of the memory controller. In this embodiment, the system management unit also decreases the power budget allocated to the memory subsystem by an amount inversely proportional to the number of critical memory requests stored in the pending request queue of the memory controller. In this embodiment, the system management unit increases the power budget allocated to the processor(s) by the same amount that the power budget allocated to the memory subsystem is decreased so that the total power budget, and thus the total power consumption, remains the same.

If the number of critical memory requests stored in the pending request queue of the memory controller is greater than or equal to the first threshold “N” (conditional block 525, “no” leg), then the system management unit determines if the number of critical memory requests is less than a second threshold “M” (conditional block 535). If the number of critical memory requests is less than a second threshold “M” (conditional block 535, “yes” leg), then the system management unit maintains the current power budget allocation for the memory subsystem and the one or more processors (block 510). If the number of critical memory requests is greater than or equal to the second threshold “M” (conditional block 535, “no” leg), then the system management unit reallocates power from the processor(s) to the memory subsystem (block 540). After blocks 510, 530, and 540, method 500 ends. Alternatively, after blocks 510, 530, and 540, method 500 returns to block 505.

Referring now to FIG. 6, one embodiment of a method 600 for modifying memory controller operation responsive to a reduced power budget is shown. In the example shown, a system management unit determines an amount of power to allocate to a memory subsystem (block 605). A system or apparatus includes at least one or more processors, the system management unit, a bridge, and the memory subsystem. The memory subsystem includes a memory controller and one or more memory devices. Depending on the embodiment, the system management unit can utilize one or more of a number of tasks which the one or more processors have to execute, the current operating point of the one or more processors, the consumed memory bandwidth, the number of critical and non-critical pending requests in the memory controller, the temperature of one or more components and/or the temperature of the entire system, and/or one or more other metrics for determining how much power to allocate to the memory subsystem. The system management unit conveys an indication of the memory subsystem's power budget to the memory controller (block 610). The memory controller converts the power budget to a number of memory requests that can be performed per unit of time (block 615). In some embodiments, block 620 is included in which the memory controller can adjust the number of memory requests that can be performed based on various other factors. For example, in one embodiment, the number of memory requests per unit of time is adjusted to allow issuing memory requests to a currently open DRAM row. To illustrate this adjustment, in one embodiment, if the number of memory requests per unit of time is 12, and a predetermined number of memory requests that can access a currently open DRAM row regardless of the request criticality is N, resulting in an adjustment to 12+N. In another embodiment, the memory controller can also adjust the number of memory requests that can be performed per unit of time based on a number of requests that are pending in the memory controller for at least a threshold of "N" cycles. Depending on the embodiment, the threshold "N" can be set statically at design time by system software or the threshold "N' can be set dynamically by hardware.

Next, the memory controller prioritizes performing critical requests to memory while potentially delaying non-critical requests and while remaining within the currently allocated budget (e.g., up to the allowable number of memory requests per unit of time) (block 625). If all critical requests stored in the pending request queue have been processed (conditional block 630, "yes" leg), then the memory controller processes non-critical requests while remaining within the current power budget (block 635). In one embodiment, processing non-critical requests while remaining within the current power budget comprises processing non-critical requests without exceeding the allowable number of requests per unit time. If not all critical requests stored in the pending request queue have been processed (conditional block 630, "no" leg), then method 600 returns to block 625. From time to time, the system management unit can send a new indication of a new power budget to the memory controller. When the memory controller receives the indication, method 600 can return to block 615.

Referring now to FIG. 7, one embodiment of a method 700 for transferring a portion of a power budget between system components is shown. In the example shown, a system management unit transfers a portion of a power budget from a memory subsystem to one or more processors (block 705). In one embodiment, the system management unit transfers a power budget from the memory subsystem to the one or more processors in response to detecting a first condition. Depending on the embodiment, the first condition can include the one or more processors having tasks to execute and the one or more processors running at operating point(s) below the nominal operating point(s), a number of critical memory requests stored in a pending request queue of a memory controller is above a first threshold, and/or other conditions. The memory subsystem can include a memory controller and one or more memory devices.

Next, the system management unit conveys an indication of a reduced power budget to the memory controller responsive to transferring the portion of the power budget to the one or more processors (block 710). Then, the memory controller receives the indication of the reduced power budget (block 715). Next, the memory controller converts the reduced power budget into a first number of memory requests per unit of time (block 720). Then, the memory controller performs a number of memory requests per unit of time to memory that is less than or equal to the first number (block 725). The memory controller can prioritize performing critical memory requests to memory while delaying non-critical memory requests so as to limit the total number of memory requests that are performed per unit of time to the first number. The memory controller optionally allows pending critical and non-critical requests to issue to a currently open DRAM row as long as a given memory-power constraint is being met (block 730). After block 730, method 700 ends.

Figure 8:
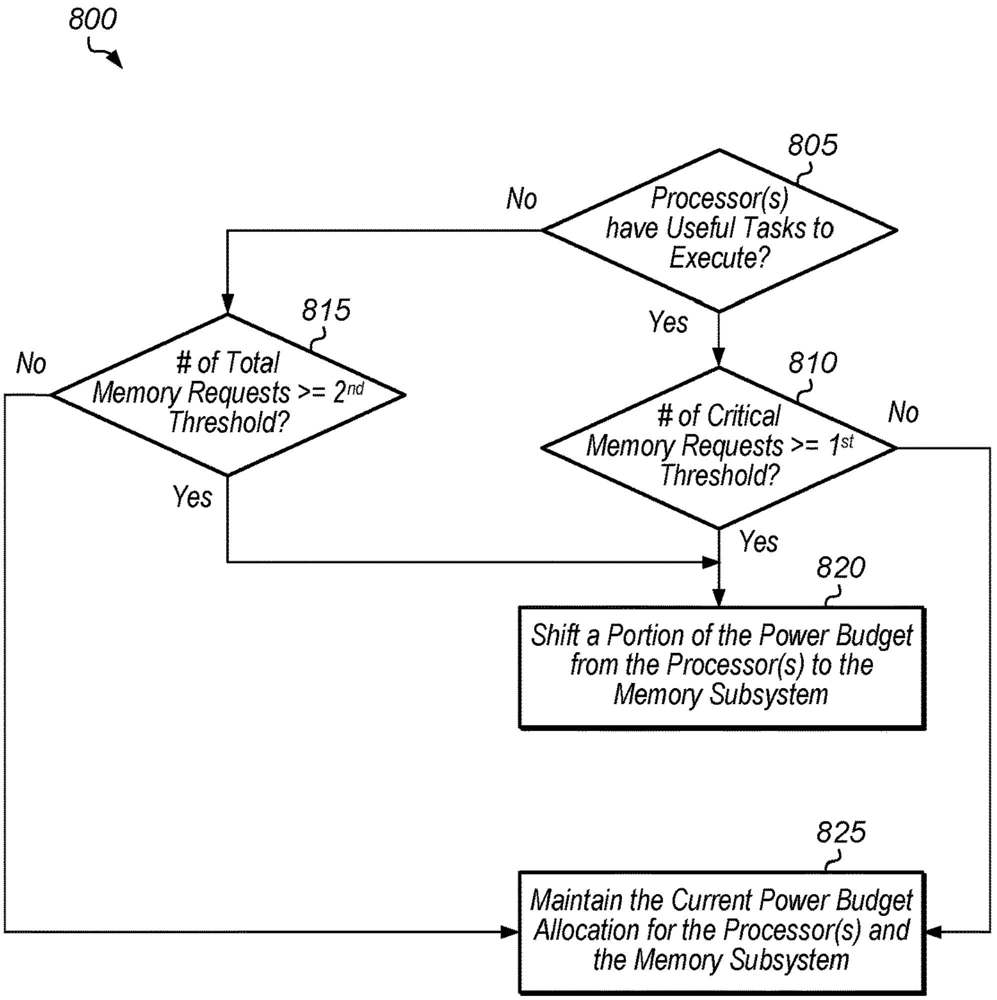
FIG. 8 is a generalized flow diagram illustrating another embodiment of a method for transferring a portion of a power budget between system components.

Turning now to FIG. 8, another embodiment of a method 800 for transferring a portion of a power budget between system components is shown. In the example shown, a system management unit determines if one or more processors have tasks to execute (conditional block 805). If the one or more processors have tasks to execute (conditional block 805, "yes" leg), then the system management unit determines if the number of pending critical memory requests in the memory controller is greater than or equal to a first predetermined threshold (conditional block 810). If the one or more processors do not have tasks to execute (conditional block 805, "no" leg), then the system management unit determines if the number of pending critical and non-critical memory requests in the memory controller is greater than or equal to a second predetermined threshold (conditional block 815).

If the number of pending critical memory requests in the memory controller is greater than or equal to the first predetermined threshold (conditional block 810, "yes" leg), then the system management unit shifts a portion of the power budget from the processor(s) to the memory subsystem (block 820). In one embodiment, the amount of power that is shifted from the processor(s) to the memory subsystem is proportional to the number of pending critical memory requests. In another embodiment, a predetermined amount of power is shifted from the processor(s) to the memory subsystem. If the number of pending critical memory requests in the memory controller is less than the first predetermined threshold (conditional block 810, "no" leg), then the system management unit maintains the current power budget allocation for the processor(s) and the memory subsystem (block 825).

If the number of pending critical and non-critical memory requests in the memory controller is greater than or equal to the second predetermined threshold (conditional block 815, "yes" leg), then the system management unit shifts a portion of the power budget from the processor(s) to the memory subsystem (block 820). Otherwise, if the number of pending critical and non-critical memory requests in the memory controller is less than the second predetermined threshold (conditional block 815, "no" leg), then the system management unit maintains the current power budget allocation for the processor(s) and the memory subsystem (block 825). After blocks 820 and 825, method 800 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
- power management circuitry configured to allocate power budgets to components within the system;
- a memory controller comprising:
  - a pending queue comprising circuitry configured to store critical memory requests and non-critical memory requests; and
  - circuitry configured to convey an indication of a number of memory requests stored in the pending queue that are critical:
- one or more processors comprising circuitry configured to generate memory requests targeting a memory coupled to the memory controller; and
- a system management unit comprising circuitry configured to:
  - receive an indication of memory bandwidth utilization; and
  - receive the indication of the number of memory requests stored in the pending queue that are critical; and
- remove a portion of a power budget currently allocated to a memory subsystem and re-allocate at least some of the portion of the power budget removed from the memory subsystem to the one or more processors, responsive to detection of a power budget re-allocation condition that is based at least in part on the indication of memory bandwidth utilization and the number of memory requests stored in the pending queue that are critical is less than a threshold;
- wherein responsive to re-allocation of the at least some of the portion of the power budget removed from the memory subsystem to the one or more processors, the memory controller is configured to delay non-critical memory requests received from the one or more processors while performing critical memory requests to the memory.

2. The system as recited in claim 1, wherein the re-allocation condition comprises the one or more processors having tasks to execute and running at an operating point below a nominal operating point, wherein an operating point comprises one or more of a frequency of a clock signal provided to the one or more processors and a supply voltage provided to the one or more processors.

3. The system as recited in claim 2, wherein the portion of the power budget which is re-allocated to the one or more processors is proportional to the number of critical memory requests stored in the pending queue of the memory controller.

4. The system as recited in claim 3, wherein:
- a memory request marked as critical is one of:
  - a request that has at least a given number of dependent instructions;
  - a request that corresponds to a previous request that caused a stall of at least a given number of cycles;
  - a request issued by a thread that holds a lock;
  - a request issued by a previous thread that has not yet reached a synchronization point; and
  - a request otherwise deemed likely to reduce performance if delayed; and
- a memory request marked as non-critical is a request not deemed a critical memory request.

5. The system as recited in claim 1, wherein the system management unit circuitry is configured to remove a portion of a power budget currently allocated to the one or more processors and re-allocate the portion to the memory subsystem, responsive to detecting a second condition.

6. The system as recited in claim 1, wherein the memory controller further comprises circuitry configured to:
- receive an indication of a reduced power budget;
- convert the reduced power budget into a first number of memory requests per unit of time; and
- perform a number of memory requests per unit of time to the memory that is less than or equal to the first number of memory requests per unit of time.

7. The system as recited in claim 6, wherein the memory controller is further configured to utilize a status of the memory to adjust the first number of memory requests per unit of time.

8. A method comprising:
- allocating, by power management circuitry, power budgets to components within a system;
- storing, by a memory controller, critical memory requests and non-critical memory requests in a pending queue;
- conveying, by circuitry of the memory controller, an indication of a number of memory requests stored in the pending queue that are critical;
- generating, by one or more processors comprising circuitry, memory requests targeting a memory coupled to the memory controller;
- receiving, by a system management unit comprising circuitry, an indication of memory bandwidth utilization;
- receiving, by the system management unit, the indication of the number of memory requests stored in the pending queue that are critical;
- responsive to a re-allocation condition, removing, by the system management unit comprising circuitry, a portion of a power budget currently allocated to a memory subsystem and re-allocate at least some of the portion of the power budget removed from the memory subsystem to the one or more processors, responsive to detection of a power budget re-allocation condition that is based at least in part on the indication of memory bandwidth utilization and the number of memory requests stored in the pending queue that are critical is less than a threshold; and responsive to re-allocation of the at least some of the portion of the power budget removed from the memory subsystem the one or more processors, delaying, by the memory controller, non-critical memory requests received from the one or more processors while performing critical memory requests to the memory.

9. The method as recited in claim 8, wherein the re-allocation condition comprises the one or more processors having tasks to execute and running at an operating point below a nominal operating point.

10. The method as recited in claim 9, wherein a memory request marked as critical is one of a request that has at least a given number of dependent instructions and a request issued by a previous thread that has not yet reached a synchronization point.

11. The method as recited in claim 8, wherein the portion of the power budget which is re-allocated to the one or more processors is proportional to the number of critical memory requests stored in the pending queue of the memory controller.

12. The method as recited in claim 8, further comprising removing a portion of a power budget currently allocated to the one or more processors and re-allocating the portion to the memory subsystem, responsive to detecting a second condition.

13. The method as recited in claim 8, further comprising: performing a number of memory requests per unit of time to the memory that is less than or equal to a first number of memory requests per unit of time, the first number of memory requests corresponding to a given power budget.

14. The method as recited in claim 13, further comprising utilizing a status of the memory to adjust the first number of memory requests per unit of time.

15. An apparatus comprising:

power management circuitry configured to allocate power budgets to components within the system;

a memory controller comprising:

a pending queue comprising circuitry configured to store critical memory requests and non-critical memory requests; and circuitry configured to convey an indication of a number of memory requests stored in the pending queue that are critical; and a system management unit comprising circuitry;

wherein the system management unit circuitry is configured to:

receive an indication of memory bandwidth utilization; and receive the indication of the number of memory requests stored in the pending queue that are critical;

remove a portion of a power budget currently allocated to a memory subsystem and re-allocate at least some of the portion of the power budget removed from the memory subsystem to one or more processors, responsive to detection of a power budget re-allocation condition that is based at least in part on the indication of memory bandwidth utilization and the number of memory requests stored in the pending queue that are critical is less than a threshold; and wherein responsive to re-allocation of the at least some of the portion of the power budget removed from the memory subsystem to one or more processors, the memory controller comprises circuitry configured to delay non-critical memory requests while performing critical memory requests to the memory.

16. The apparatus as recited in claim 15, wherein the re-allocation condition comprises receiving a second indication that the one or more processors have tasks to execute and are running at an operating point below a nominal operating point.

17. The apparatus as recited in claim 16, wherein the portion of the power budget which is re-allocated to the one or more processors is proportional to the number of critical memory requests stored in the pending queue of the memory controller.

18. The apparatus as recited in claim 17, wherein:

a memory request marked as critical is one of:

a request that has at least a given number of dependent instructions;

a request that corresponds to a previous request that caused a stall of at least a given number of cycles;

a request issued by a thread that holds a lock;

a request issued by a previous thread that has not yet reached a synchronization point; and a request otherwise deemed likely to reduce performance if delayed; and a memory request marked as non-critical is a request not deemed a critical memory request.

19. The apparatus as recited in claim 15, wherein the memory controller is configured to: perform a number of memory requests per unit of time to the memory that is less than or equal to a given number of memory requests per unit of time, wherein the given number of memory requests per unit of time is based on a power budget.

20. The apparatus as recited in claim 19, wherein the memory controller is further configured to utilize a status of the memory to adjust the number of memory requests per unit of time.

* * * * *